United States Patent Office 3,115,178
Patented Dec. 24, 1963

3,115,178
TRACTIVE COMPOSITIONS
Leandro W. Tomarkin, Hungry Hollow Road,
Spring Valley, N.Y.
No Drawing. Filed Feb. 18, 1963, Ser. No. 259,390
9 Claims. (Cl. 152—211)

This invention relates to tractive compositions, and more specifically, concerns elastomeric compositions useful in the manufacture of tires, tire retreading material, rubber footwear, anti-skid materials and the like.

This application is a continuation in part of application Ser. No. 8,239, filed February 12, 1960, now abandoned.

It has been proposed to add various forms and types of material as inclusions for tread rubber to increase the tractive properties of tires, overshoes, belts and the like. Such inclusions have been used in granular form, including abrasive particles such as Carborundum or the like, as well as non-abrasive materials including wood particles and the like.

However, the compounding of hard abrasive particles with rubber, necessarily presents a number of problems, including adverse affects of the particles on the compounding rolls and milling equipment; and further, may materially reduce the normal life expectancy of the finished product. The non-abrasive type of inclusions known in the art also present problems in compounding or may be of limited utility in use.

One object of this invention is to provide improved tread compositions which show excellent anti-skid properties when used as tire treads over icy roads, as well as on roads having hard packed snow; such tread compositions also showing superior tractive properties for vehicles traveling over grades.

Another object of this invention is to provide an improved tractive composition including elastomeric particles as inclusions in an elastomeric matrix; such particles imparting improved tractive and anti-skid properties to the composition, yet not materially reducing the normal life expectancy of tires or the like which incorporate the same.

It has been found that improved tractive compositions for use as original tire treads or retreading worn tires, are formed by mixing vulcanizable elastomeric tread stock with granular elastomeric material having a given range of hardness, such granular material being uniformly distributed through the tread stock which represents a predominant proportion of the mixture.

The mixture of matrix and granular materials is adapted to be vulcanized in a conventional manner, in the form of the tread portion of a new tire; as a retread for a worn tire; or in the manufacture of other articles having surface portions with superior tractive properties. In the final vulcanized condition, the granular material has a hardness of the order which is less than that of conventional hard rubber or ebonite, yet greater than that of conventional soft rubber or tread rubber stock. Furthermore, the granular inclusions are well bonded to the softer, matrix material.

The granular material is derived from rubberlike elastomers such as natural or synthetic rubber, which is compounded with the usual vulcanizing agents, modifiers, antioxidants and the like, partially cured in sheet form and such sheet is then cut or chopped to convert the same into granules of selected size.

The elastomeric material from which the granular material is derived, may be natural rubber or a synthetic rubber such as butadiene-acrylonitrile copolymer or butadiene-styrene copolymer. The synthetic rubbers are of the type generally known in the tire and related arts and may have varying proportions of the monomers making up such copolymers, as is well known in the art.

By way of example, granular material was made as follows:

Example 1

A composition was prepared from the following ingredients in parts by weight:

| | |
|---|---:|
| Butadiene-acrylonitrile copolymer (68% butadiene-32% acrylonitrile) | 100.0 |
| Sulfur | 19.0 |
| Accelerator (aldehyde-amine type) | 2.0 |
| Softener (Paraplex G-25, polyester type) | 8.0 |
| Light calcined magnesia | 10.0 |
| | 139.0 |

The ingredients were mixed on a two-roll mill and sheeted out. The sheeted stock was partially vulcanized at 300° F. for about 5 minutes to give a hardness of 34 on the Shore D scale.

The sheeted stock was then diced to produce granules of cube form with maximum dimensions ranging from about 0.05 to 0.15" and an average maximum dimension of about 0.075".

The resultant granular material is combined with conventional tread stocks used in making tire treads or camelback, which include the usual vulcanizing agents, accelerators, anti-oxidants, modifiers and the like. Thus, tread stock was prepared on a mill including butadiene-acrylonitrile copolymer, stearic acid, zinc oxide, furnace black, accelerator, sulfur, and pine tar, together with granular material of Example 1; such granular material amounting to 20% of the total weight of the tread formulation. The granular material did not adversely affect the milling rolls.

The tread stock was then extruded in the usual manner and applied to tire carcass and placed in a conventional vulcanizer wherein the complete tire assembly was vulcanized at about 300° F. in the usual manner. The granular material now appeared as distinct inclusions in the tread layer, well bonded to the matrix of the tread and showing a hardness of about 55 on the Shore D scale, the matrix stock having the usual low sulfur content is materially softer than the inclusions.

Example 2

Granular material was prepared from the following formulation, given in parts by weight:

| | |
|---|---:|
| Natural rubber (smoked sheet) | 100.0 |
| Sulfur | 24.00 |
| Accelerator (aldehyde-amine type) | 0.8 |
| Petroleum fraction (softener) | 9.0 |
| | 133.8 |

The ingredients were mixed in a Banbury, sheeted out and vulcanized at 320° F. for 20 minutes. The sheet was then diced to provide partially vulcanized granules having a maximum dimension of from about 0.05 to about 0.15" and classified to show an average maximum dimension of about 0.075". Such granules had a hardness of about 28 on the Shore D scale.

A conventional tire tread formulation was prepared by milling natural rubber (smoked sheet) with stearic acid, zinc oxide, pine tar 600, furnace black, sulfur in the proportion of 2.8 parts to 100 parts of smoked sheet, by weight, and accelerator. After milling, granular material of Example 2 was added to the milled tread stock while still on the rolls and milling was continued to obtain a uniform distribution of the granular material in the tread stock. Such granular material constituted 18% of the total weight of the finally milled stock.

The tread stock was then extruded in the usual manner to provide the tread layer for a tire carcass prepared in the usual manner and the assembly was vulcanized in conventional tire molds at 295° F. The finished tire showed the inclusions in the tread layer, which were well bonded to the matrix layer and such inclusions had a hardness of 62 on the Shore D scale.

The granular material of Example 2 was milled with a natural rubber formulation containing 2.75 parts of sulfur to 100 parts of smoked sheet, by weight, together with 50 parts by weight of carbon black, 4 parts of stearic acid, 5 parts of zinc oxide, 2.5 parts of pine tar, 1.5 parts of antioxidant (phenyl b-naphthylamine); the granular material amounting to 16% of the total composition, by weight. The milled composition was extruded to provide camelback for retreading worn tires.

*Example 3*

Granular material was prepared from a formulation made up of 100 parts of butadiene-styrene copolymer (76% butadiene-24% styrene), 18 parts of sulfur, 0.6 parts of accelerator, and 9 parts of softener (petrolatum). The ingredients were mixed on a Banbury, sheeted, partially vulcanized at 292° F. for 20 minutes and then diced to cubes of the size indicated above. Such diced material had a hardness of 30 on the Shore D scale.

The granular material of Example 3 was combined with a tire tread composition made up of butadiene-styrene copolymer sulfur, carbon black, stearic acid, zinc oxide, accelerator (tetramethylthiuram sulfide), antioxidant and softeners, the sulfur being in an amount of 1.8 parts to 100 parts of copolymer by weight. The granular material, amounting to 18% of the total weight of the combined materials, is preferably added in the latter stages of milling of the tread composition. Such resultant tread was associated with a tire carcass and vulcanized in the usual tire molds at about 295° F. The granular inclusions were well distributed in the tread, tightly bonded to the softer matrix and such inclusions in their completely vulcanized form had a hardness of 64 on the Shore D scale.

The granular material made in accordance with any of Examples 1, 2 or 3, above; was combined with a tread stock derived from butyl rubber (isobutylene-isoprene copolymer or isobutylene-butadiene copolymer) where 100 parts of the butyl rubber is mixed with 40 parts of carbon black, 5 parts of zinc oxide, 1 part of stearic acid, 10 parts of process oil, 0.8 part of sulfur, 1 part of tellurium diethyldithiocarbamate and 1 part of benzothiazyl disulfide, all by weight. The granular material amounted to 20% by weight of the combined materials.

The milled combination was extruded to provide tire tread for association with a butyl rubber tire carcass with vulcanization at 307–312° F. in the usual tire molds.

It has been found that the granular material made in accordance with any of Examples 1, 2 or 3 may be used as inclusions in tread stock made of either natural rubber, butadiene-acrylonitrile butadiene-styrene or the isobutylene copolymers known as butyl rubber, and in all cases the inclusions were well bonded to the softer matrix material. It was found that wear of tires incorporating such special treads did not dislodge the inclusions and there were no pits in the tread after extended wear. Such tires, either in original or recapped form, made in accordance with the invention, exhibited excellent traction properties under skid conditions at level or on grades.

The granular material of the instant invention, in its partially vulcanized condition has a hardless of the order of about 24 to about 36 on the Shore D scale. To this end, the sulfur content of the compositions from which such granular material is formed, is limited to from about 12.5 to about 19.0% by weight of the combination of granular material and tread stock.

The inclusion of the granular material described above in tread stock for tires or camelback, does not affect the conventional formulation of the selected tread stock, be it natural or synthetic rubber, nor does it affect the usual milling operations incident to the formation of the tread stock or the final vulcanizing operations in the usual tire molds at their usual vulcanizing temperatures.

The resultant fully vulcanized tread will have inclusions of preferably cube shape with an average maximum dimension of 0.075″; and in amounts of from 15 to 24% by weight, preferably 20% of the tread stock extruded for application to a tire, either as a new tire or as camelback for retreading a worn tire.

The formation of tread stock which incorporates the granular material of the instant invention, is prepared in a conventional manner on milling rolls or in a Banbury; the ingredients of the matrix stock being mixed and milled in the usual manner, followed by the addition of the indicated proportion of granular material at the end of the mixing operation so that such granular material is well distributed through the normal matrix stock. The resultant mixture of matrix stock and inclusions is then sheeted or extruded into desired form for immediate or later assembly with a tire carcass in accordance with conventional tire making procedures, or for packaging as camelback for ultimate use in retreading worn tires.

It has been found that granular material made in accordance with the invention will exhibit a final hardness in the completely vulcanized product incorporating the same, as in the tread of a new or retreaded tire, will have a hardness of from about 45 to about 70 on the Shore D scale. The tires incorporating such granular inclusions exhibit excellent tractive properties, particularly on icy or hard packed snow covered roads.

Thus, a series of comparative tests were conducted on a particular road covered with hard packed snow on an icy base, under temperature conditions of from 15 to 31° F., such road having in addition to level portions, grades of the order of 5%, 7.5%, 10%, 15% and 18%. Such tests involved the operation of a single vehicle with repeated trips up and down the test road, with a different set of 4 test tires for each combination ascent and descent.

The sets of test tires, identified as A, B, C, D, E, F and G respectively, differed as follows. The tread of all the tires was prepared from the same conventional tread stock of natural rubber and had incorporated in such tread stock granular rubber of an average maximum dimension of about 0.075″ and in an amount of about 20% by weight of the entire tread layer. However, the granular material in each set of tires was independently compounded so as to exhibit in the finally vulcanized tires a hardness different from the tires of the other sets.

Thus, such hardness values of the granular material, on the Shore D scale, was respectively for A–37; for B–41; for C–46; for D–60; for E–70; for F–74; and for G–85.

When driving on the level, tire sets A and B allowed a maximum safe speed of the order of 15–20 m.p.h.; sets C, D and E allowed a maximum safe speed of about 30–50 m.p.h.; and sets F and G a maximum safe speed of about 20–28 m.p.h.; each tire set being used over the same road portion.

When driving as indicated above, on level road portions but applying brakes by repeated pumping action; the following was noted: with tire sets A and B, side sway, swerving and skidding was encountered with each brake application; with tire sets C, D and E, no sway or skidding was apparent with initial brake application, slight skidding in a forward direction occurred with final application of the brake resulting in locking of the wheels; and with tire sets F and G, skidding in various directions occurred with each pumping brake application.

When driving down grades of 7.% or more, and braking, tire sets A and B gave rise to hazardous conditions and the car could not hold a set position. With tire sets C, D and E, the car held a braked position at a speed of 10–15 m.p.h. With tire sets F and G, the car held a braked position at a speed of not more than 3 m.p.h., and with higher speeds, braking resulted in skidding and inability to hold a braked position.

When driving up grades from a standing start, tires A and B had no traction on grades of 7.5% or greater and showed little traction on a 5% grade. With tire sets C, D and E, traction was obtained together with progressive increase in speed while moving up from a standing start on all grades. With tire sets F and G, no traction was obtained on grades of 7.5% or more, from a standing start; some traction was obtained with a moving start but was accompanied by progressive deceleration.

When travelling on curved road portions, tire sets C, D and E allowed speeds up to 30 m.p.h. on the level and speeds of 12–15 m.p.h. on descending curved grades of 7.5% or more. Tire sets A and B could not safely negotiate curves at speeds above 5 m.p.h. on the level or on down grades. With tire sets F and G, speeds up to 10 m.p.h. on curves, level or down grade, involved hazards.

With tire sets F and G, wear of the tire treads was accompanied by loss of granular material leaving small pitted areas in the treads and such wear was at a rate of about 35–50% in excess of wear in a conventional tire tread. With tire sets C, D and E, the granular material did not separate from the matrix with wear thereof and such wear was at the rate of 5–8% in excess of conventional tread wear. Tire sets A and B had a wear rate of about 2–3% greater than that of conventional tire treads.

As various changes might be made in the embodiments of the invention herein disclosed without departing from the spirit thereof, it is understood that all matter herein shown or described shall be deemed illustrative and not by way of limitation except as set forth in the appended claims.

What is claimed is:

1. A tractive composition comprising a matrix of vulcanizable elastomer selected from the group consisting of natural rubber, butadiene-acrylonitrile copolymer, butadiene-styrene copolymer, isobutylene-isoprene copolymer and isobutylene-butadiene copolymer, and granular elastomer selected from the group consisting of natural rubber, butadiene-acrylonitrile copolymer and butadiene-styrene copolymer distributed through said matrix, the granular portion of the composition upon vulcanization of the composition having a hardness of from about 45 to about 70 on the Shore D scale, said matrix being softer than said granular portion.

2. A tractive composition as in claim 1 wherein said granular elastomer comprises from about 15 to about 24% by weight of the composition.

3. A tractive composition as in claim 1 wherein said granular elastomer has an average maximum dimension of about 0.075".

4. A sheet of camelback comprising a layer of vulcanizable tread rubber and granular elastomer uniformly distributed through said layer, said granular elastomer being selected from the group consisting of natural rubber, butadiene-acrylonitrile copolymer and butadiene-styrene copolymer, said granular elastomer being partially vulcanized and upon complete vulcanization of said sheet, said granular elastomer having a hardness of from about 45 to about 70 on the Shore D scale.

5. A tire having a vulcanized tread portion of elastomer selected from the group consisting of natural rubber, butadiene-acrylonitrile copolymer, butadiene-styrene copolymer, isobutylene-isoprene copolymer and isobutylene-butadiene copolymer, and elastomeric granules distributed through said matrix and bonded thereto, said granules being selected from the group consisting of natural rubber, butadiene-acrylonitrile copolymer and butadiene-styrene copolymer, said granules being completely vulcanized and having a hardness of from about 45 to about 70 on the Shore D scale.

6. A tractive composition comprising a matrix of butadiene-styrene copolymer and granules of butadiene-styrene copolymer distributed through said matrix, said granules having a hardness of from about 45 to about 70 on the Shore D scale upon complete vulcanization of said composition and said matrix being softer than said granules.

7. A tread composition comprising a vulcanizable elastomeric matrix portion and vulcanizable granules of elastomeric material uniformly distributed through said matrix portion, said matrix portion being selected from the group consisting of natural rubber, butadiene-acrylonitrile copolymer, butadiene-styrene copolymer, isobutylene-isoprene copolymer and isobutylene-butadiene copolymer, and said granules being selected from the group consisting of natural rubber, butadiene-acrylonitrile copolymer and butadiene-styrene copolymer, wherein upon complete vulcanization of said composition said granules will have a hardness of from about 45 to about 70 on the Shore D scale, and said granules amount to about 20% by weight of said composition.

8. A tread composition as in claim 7 wherein said granules have a maximum dimension of from about 0.05 to about 0.15".

9. A tread composition as in claim 7 wherein said granules include from about 12.5 to about 19.0% sulfur based on the weight of said granules.

References Cited in the file of this patent

UNITED STATES PATENTS

| | | |
|---|---|---|
| 1,973,748 | Cadwell | Sept. 18, 1934 |
| 2,575,851 | Taylor | Nov. 20, 1951 |
| 2,690,461 | Steeves | Sept. 28, 1954 |

FOREIGN PATENTS

| | | |
|---|---|---|
| 383,962 | Great Britain | Nov. 24, 1932 |

OTHER REFERENCES

Fisher: "Industrial and Engineering Chemistry," volume 31, No. 8, pages 941–945 (1939).

Gall: "Rubber Age," volume 65, No. 4, pages 417–423 (1949).